March 24, 1964  L. F. SMREKAR  3,125,913
ADJUSTABLE FEED FINGER AND COLLET ALIGNMENT DEVICE
Filed July 27, 1962  2 Sheets-Sheet 1

INVENTOR.
LARRY F. SMREKAR
BY
Bosworth, Sessions,
Herrstrom & Knowles
ATTORNEYS

March 24, 1964 L. F. SMREKAR 3,125,913
ADJUSTABLE FEED FINGER AND COLLET ALIGNMENT DEVICE
Filed July 27, 1962 2 Sheets-Sheet 2

INVENTOR.
LARRY F. SMREKAR
BY Bosworth, Sessions,
Herrstrom & Knowles
ATTORNEYS

United States Patent Office 3,125,913
Patented Mar. 24, 1964

3,125,913
ADJUSTABLE FEED FINGER AND COLLET
ALIGNMENT DEVICE
Larry F. Smrekar, Solon, Ohio, assignor to Balas Collet
Manufacturing Co., Cleveland, Ohio, a corporation of
Ohio
Filed July 27, 1962, Ser. No. 212,843
3 Claims. (Cl. 82—28)

This invention relates to hollow spindle machine tools such as screw machines, turret lathes or the like, and more particularly to an improved adjustable feed finger support whereby the feed finger may readily be angularly aligned with the stock chuck or collet to accommodate stock of non-circular cross section.

In hollow spindle machine tools of the type where bar stock is fed through the spindle until its forward end projects out beyond the collet in working position, the bar is gripped by the collet, the part is cut off after the desired machining operations have been performed and another length of stock pushed out for the next operation, a troublesome and time consuming operation has been necessary whenever the machine is set up to handle rod or bar stock of a particular non-circular cross section. This operation is the angular alignment of the non-circular opening in the feed finger or pusher with the adjacent non-circular opening in the gripping portion of the collet so that the entering end of each new length of stock may readily be pushed through the feed fingers into and through the collet. With prior arrangements it has been necessary to use a more or less blind, cut and try procedure involving numerous time-consuming adjustments of the feed finger on the feed finger tube until the proper alignment is reached.

An object of the present invention is to provide an effective, simple and readily accessible means for angularly adjusting the position of the stock pusher or feed finger of a hollow spindle machine tool relative to the stock gripping chuck or collet. Further objects of my invention include: the provision of means for adjusting the relative angular positions of such a feed finger and collet whereby alignment thereof may be quickly effected to permit the handling of bar stock of a particular non-circular cross section and which may readily be re-set to effect proper alignment when the feed finger and collet are changed to handle stock of a different non-circular cross section; and the provision of an adjustable feed finger and collet alignment means of the type described which may readily be adapted to existing machine tools, which occupies a minimum of space, and which is inexpensive to manufacture and requires substantially no upkeep or maintenance.

The above and other objects of my invention will appear from the following description of one embodiment thereof, reference being had to the accompanying drawings in which:

FIGURE 3 is a cross-sectional view, taken substantially on line 3—3 of FIGURE 1, illustrating a feed finger or pusher contoured to handle hexagonal bar stock;

Figure 1:
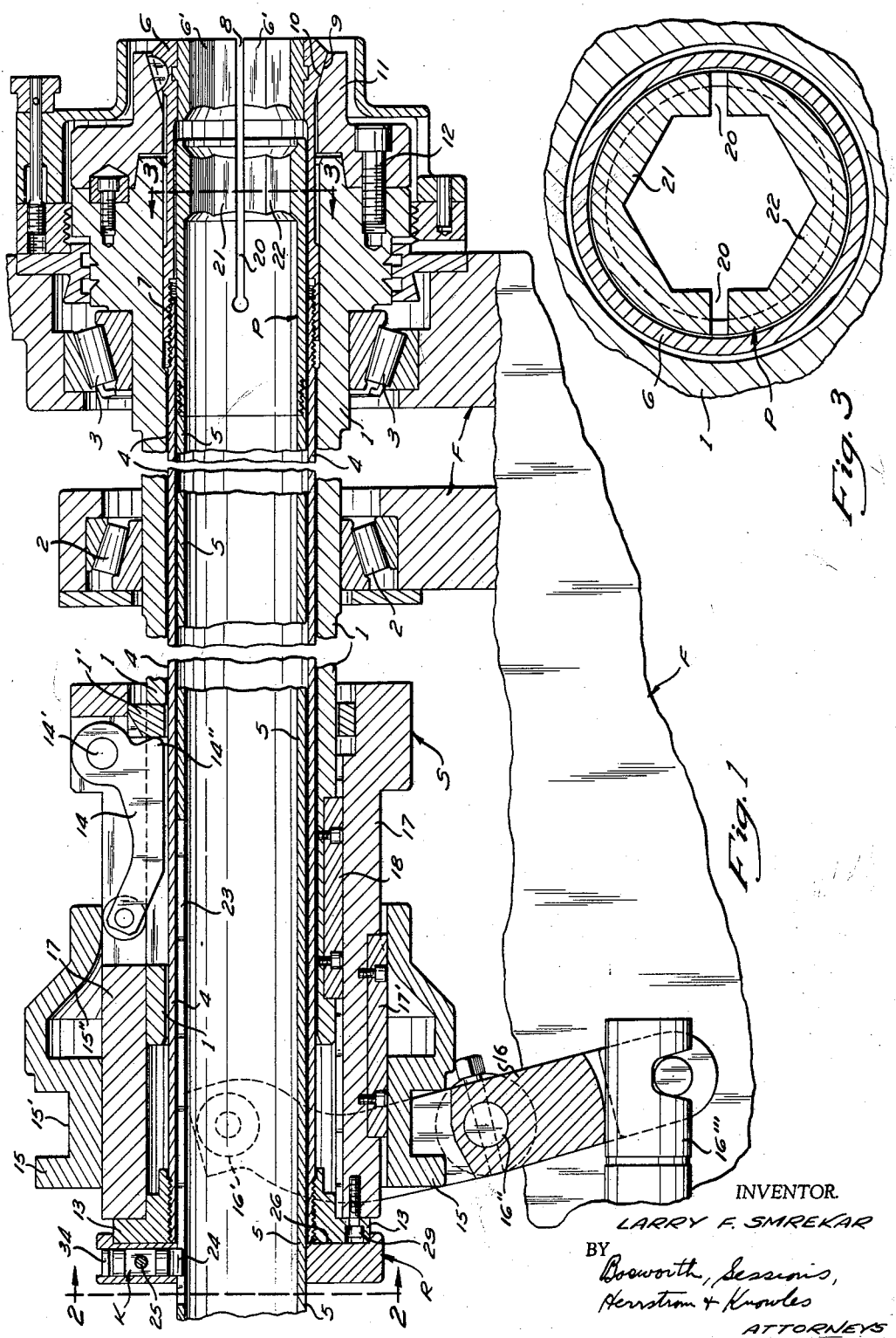
FIGURE 1 is a vertical cross-sectional view of the rotating hollow spindle of a machine tool in which my improved feed finger and collet aligning means is incorporated, the view being broken to omit certain central portions of spindle for convenience of illustration.

Referring to the drawings, the rotating spindle of a typical machine tool is generally indicated at S. This spindle includes three concentric tubular elements, i.e. the outer spindle 1 which is supported for rotation in suitable bearings 2 and 3 mounted in the stationary frame F of the machine tool, the inner spindle or chuck or collet operating tube 4, and the feed finger or pusher tube 5.

A stock chuck or collet 6 is secured to the outer (right-hand in FIGURE 1) end of the collet operating tube 4 as by threaded engagement seen at 7. This collet 6 is split in the usual manner as indicated at 8 and has a tapered face 9 which engages and coacts with a correspondingly tapered face 10 in the collet ring member 11 which in turn is secured to the end of the outer spindle 1 as by screws 12. Removable collet jaws 6', contoured to accommodate hexagonal bar stock in the embodiment illustrated in the drawings, are mounted at the outer end of the collet 6 in the usual manner.

It will be understood that, due to the engagement of the tapered or inclined faces 9 and 10, relative longitudinal movement of the collet operating tube 4 and the outer spindle 1 will cause the jaws 6' of the collet 6 to be contracted to grip a bar extending therethrough or to expand and release the bar.

The outer spindle 1 is rotatably mounted in the machine frame F on bearings 2 and is restricted against longitudinal movement thereby. Therefore, in order to effect gripping and releasing of the collet 6, it is necessary to cause longitudinal movement of the collet operating tube 4 and collet 6.

A collet adjusting nut 13 has threaded attachment to the left-hand end of collet operating tube 4, is rotatable therewith and forms a radially outwardly extending flange thereon, and is secured to the left-hand end of a longitudinally slidable sleeve 17 by screws 29. This sleeve 17 is supported and slidable on the outer spindle 1 but is keyed against relative rotation thereon by the key 18.

An operating ring 15 is longitudinally slidable on the sleeve 17 and is keyed against rotational movement relative thereto by a key 17'. This sleeve 15 has a circumferential groove 15' which is adapted to receive the operating ends 16' of a yoke member 16. This yoke member 16 is pivotally supported on the machine frame at 16" and may be given reciprocating movement by suitable means such as the plunger 16'''.

One or more cam fingers 14 are pivotally supported as at 14' on the sleeve 17. The outer ends of the fingers 14 are adapted to be engaged and actuated by the camming face 15" of the ring 15 as this ring is moved longitudinally on the sleeve 17 by yoke 15. The inner ends 14" of fingers 14 are adapted to abut against a thrust washer or ring 1' which engages and is held against longitudinal movement by the outer spindle 1.

The above described apparatus for actuating the collet 6 is conventional in form and need not be further described except to point out that when the operating ring 15 is moved to the left into the position of FIGURE 1 the fingers 14 will be moved counter-clockwise to the position seen in FIGURE 1. Concurrently the sleeve 17, on which fingers 14 are pivotally supported, will move to the left, carrying with it the collet adjusting nut 13 to which it is secured by screws 29 and moving the nut 13, together with the collet operating tube 4 and collet 6, to the left. This movement, because of the inclined faces 9 and 10, will cause the jaws 6' of collet 6 to contact and grip a bar which is disposed therein. When the operating ring 15 is moved to the right from the position of FIGURE 1 it will permit the cam fingers 14 to move clockwise in chuck releasing direction, thus permitting the sleeve 17, collet adjusting nut 13, collet operating tube 4, and collet 6 to move to the right, expanding the collet jaws 13 and releasing the stock.

As previously noted, the feed finger or pusher tube 5 is disposed within the collet operating tube 4 and carries at its inner end a feed finger or pusher generally indicated at P. This has threaded engagement at 19 with the tube 5 and is longitudinally split at 20 to form a pair of opposed jaws 21 and 22 which, as best seen in FIGURE 3, form a hexagonal stock gripping aperture. In use these jaws 21 and 22 resiliently grip the bar stock that extends therethrough with sufficient force to advance the stock during a feeding operation but still to be slidable over the stock back into retracted position when the stock is gripped by the collet 6.

As seen in FIGURE 1 the feed finger P is in its advanced position at the end of a stock feeding movement. It will be understood that, when the machine is in operation, after the collet 6 has gripped the stock the feed finger tube 5 and the feed finger P will be retracted (moved to the left from the position seen in FIG. 1) a distance sufficient to provide the proper length of feed stroke for the next feeding operation. The left-hand end of the feed finger tube 5 extends out beyond the left-hand of collet operating tube 4 as indicated in FIGURE 1 and is connected to be moved longitudinally to effect stock feeding by any suitable means and well known means which are not shown herein as they form no part of the present invention.

In order to retain the feed finger tube 10 and feed finger P in fixed angular relation to the collet operating tube 4 and collet 6 an elongated slot or keyway 23 is cut through the wall of tube 5. The key end 24 of a removable key member K extends into the slot 23 and has a sliding fit therein. This key member K is mounted in the feed finger adjusting ring or flange member R which, as is described below, is clamped to the collet adjusting nut 13. A lock screw 25 secures key K in position in ring R as is clearly seen in FIGURE 2.

Figure 2:
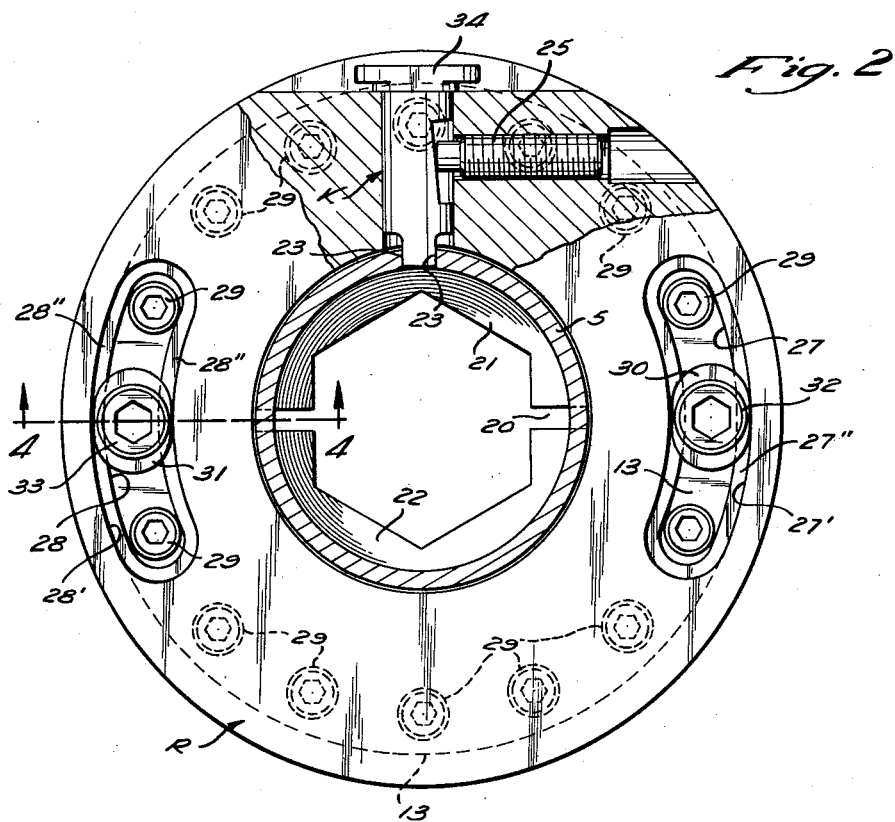
FIGURE 2 is an enlarged end elevational view, taken substantially on line 2—2 of FIGURE 1, illustrating the feed finger adjusting ring with parts broken away more clearly to show the removable key and locking means therefor.
Figure 4:
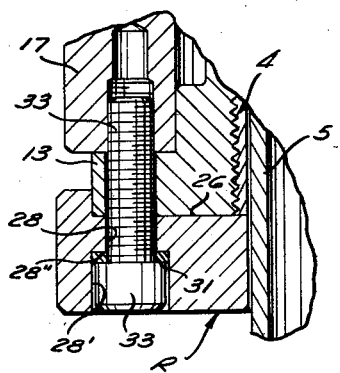
FIGURE 4 is a fragmentary cross-sectional view, taken substantially on line 4—4 of FIGURE 2, illustrating one of the locking screws for securing the feed finger adjusting ring in adjusted position.
Figure 5:
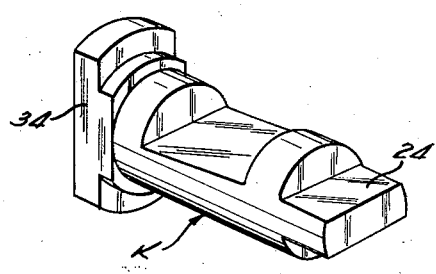
FIGURE 5 is a detached perspective view of the removable key which slidably connects the feed finger adjusting ring with the feed finger tube.

As illustrated in FIGURES 1, 2 and 4, the feed finger adjusting ring or flange member R has a recess 26 in its right-hand (FIG. 1) end face which fits over the adjacent outer face of the collet adjusting nut 13. Diametrically opposed elongated arcuate slots 27 and 28 extend through the adjusting ring R on the same radius as are the screws 29 which secure the collet adjusting nut 13 to the sleeve 17. As clearly seen in FIGURES 2 and 4, these slots 27 and 28 have enlarged outer portions 27' and 28' forming shoulders 27" and 28". Elongated clamping washers 30 and 31 rest on these shoulders 27" and 28". Clamping screws 32 and 33 extend through the washers 30 and 31 and slots 27 and 28, pass through the collet adjusting nut 13 and have threaded engagement with the sleeve 17 as is clearly seen in FIG. 4.

It will be understood from the above description that when the clamping screws 32 and 33 are loosened the feed finger adjusting ring R may be rotated on the collet adjusting nut 13 to the limit permitted by the arcuate slots 27 and 28. During such rotation of adjusting ring R the feed finger tube 5 will be given corresponding arcuate movement relative to the collet operating tube 4 because of the engagement of the key end 24 of key member K in the slot or keyway 23 of tube 5.

As the collet operating tube 4 is secured to the collet adjusting nut 13, and as this nut 13 is in turn secured to the sleeve 17 by screws 29, and as sleeve 17 is keyed to the outer spindle 1 by key 18, rotary movement of the adjusting ring R will cause rotary or angular movement of the feed finger tube 5 and feed finger P relative to the collet 6 and gripping jaws 6' thereof. By tightening the clamping screws 32 and 33 adjusting ring R will be clamped to the collet adjusting nut 13 and thus any particular angular position of the feed finger tube 5 and feed finger P relative to the collet operating tube 4 and collet 6 will be maintained. The elongated slot 23 in the feed finger tube 5 permits the necessary longitudinal movement of this tube to effect its stock feeding function but, due to the key portion 24 of key member K, the angular position of the feed finger P relative to the collet 6 will remain fixed.

In the operation of the apparatus described above, assuming that it is desired to install a new set of chuck jaws to accommodate a different size of non-circular stock, after the proper collet 6 has been mounted on the collet operating tube 4, the feed finger tube 5 is removed and the proper feed finger P is mounted at its inner end by the threaded engagement 19. To permit removal of tube 5 the key member K is removed from the feed finger adjusting ring R by withdrawing the locking screw 25 and lifting out the key member K by its head portion 34. After the feed finger tube 4, with proper feed finger P attached, is reinserted into the chuck operating tube 4 the key member K is replaced and locked in position.

At this stage of the set-up operation it is most unlikely that the hexagonal opening in the jaws 6' of the collet 6 will be in angular alignment with the hexagonal opening in the jaws 21 and 22 of the feed finger P. Any misalignment will, of course, prevent the passage of a hexagonal bar through both sets of hexagonal jaws. In order to align the jaws of the feed finger P with those of the collet 6 it is only necessary to insert a piece of bar stock through the tube 5 and the jaws 21 and 22 of the pusher P and push it forward until it engages the jaws 6' of the collet and is stopped by the misalignment of the two sets of jaws. The clamping screws 32 and 33 are loosened and the feed finger adjusting ring R is rotated in one direction or the other until the jaws of the feed finger P and those of the collet 6 become aligned and it is possible to push the stock on through the collet jaws 6'. After alignment is thus effected and the collet is caused to grip the stock the clamping screws 32 and 33 are tightened. The feed finger jaws 21 and 22 and the collet jaws 6' will then remain in alignment during feeding of successive lengths of bar stock. The aligning operation will be repeated when new sets of jaws are installed to accommodate a different size or shape of bar.

From the above description of one embodiment of my improved apparatus for aligning the pusher or feed finger of a hollow spindle machine tool with the chuck or collet thereof it will be evident that my invention provides a readily adjustable, inexpensive, trouble-free apparatus for quickly and easily effecting the necessary alignment of the feed finger and collet jaws of a hollow spindle machine tool. Although the illustrated embodiment of my apparatus shows my invention as applied to a particular design of machine tool spindle, it will be understood that it may readily be adapted to other types of spindles without departing from the spirit of my invention. I do not, therefore, wish to be limited to the exact form and arrangement of parts herein shown and described but claim as my invention all embodiments thereof coming within the scope of the appended claims.

I claim:

1. A hollow spindle for a machine tool including a rotatably supported tubular outer spindle, a collet operating tube supported within said outer spindle for rotation therewith, a collet at one end of said collet operating tube, a feed finger tube within said collet operating tube, a feed finger secured to one end of said feed finger tube, a radially outwardly extending flange rotatable with said collet operating tube at the other end thereof from said collet, a feed finger adjusting flange member supported for rotational movement relative to said radially outwardly extending flange and adjacent thereto, releasable means for securing said feed finger adjusting flange member to said outwardly extending flange to secure said flanges against relative movement, keying means carried by said feed finger adjusting flange member, and coacting keying means carried by said feed finger tube, said keying means being effective to permit longitudinal movement of said feed finger tube relative to said collet operating tube while its angular position relative to said collet operating tube is maintained unchanged.

2. In combination in the rotatable hollow spindle of a machine tool having a stationary frame, an outer spindle rotatably supported in said frame, a collet operating tube supported within said outer spindle for rotation therewith, a feed finger tube within said collet operating tube and having a longitudinally extending keyway in its outer surface, a radially outwardly extending flange secured to said collet operating tube, a feed finger adjusting flange member supported for angular movement relative to said outwardly extending flange and adjacent thereto, releasable means for securing said feed finger adjusting flange member to said outwardly extending flange, and key means carried by said feed finger adjusting flange member and extending slidably into said keyway in said feed finger tube.

3. In combination in the rotatable hollow spindle of a machine tool having a stationary frame, an outer spindle rotatably supported in said frame, a collet operating tube supported within said outer spindle for rotation therewith, a collet at one end of said collet operating tube, a feed finger tube within said collet operating tube, a feed finger secured to one end of said feed finger tube and disposed within said collet operating tube, said feed finger tube having a longitudinally extending keyway in its outer surface, a radially outwardly extending flange secured to and rotatable with said collet operating tube, a feed finger adjusting flange member supported on said radially outwardly extending flange for angular movement relative thereto, releasable means for securing said feed finger adjusting flange member to said outwardly extending flange to secure said flanges against relative movement, and a key member carried by said feed finger adjusting flange member and extending into said keyway in said feed finger tube whereby longitudinal movement of said feed finger tube is permitted while its angular position relative to said collet operating tube is maintained unchanged.

No references cited.